US009558082B2

(12) United States Patent
Antony et al.

(10) Patent No.: US 9,558,082 B2
(45) Date of Patent: *Jan. 31, 2017

(54) VM AVAILABILITY DURING MIGRATION AND VM NETWORK FAILURES IN HOST COMPUTING SYSTEMS

(71) Applicant: VMWARE, INC., Palo Alto, CA (US)

(72) Inventors: Jinto Antony, Bangalore (IN); Hariharan Jeyaraman Ganesan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 14/273,581

(22) Filed: May 9, 2014

(65) Prior Publication Data

US 2015/0278042 A1 Oct. 1, 2015

(30) Foreign Application Priority Data

Mar. 28, 2014 (IN) ............................ 1689/CHE/2014

(51) Int. Cl.
*G06F 11/20* (2006.01)
*H04L 12/24* (2006.01)
*G06F 11/14* (2006.01)

(52) U.S. Cl.
CPC ......... *G06F 11/203* (2013.01); *G06F 11/1484* (2013.01); *H04L 41/0816* (2013.01); *G06F 11/2025* (2013.01)

(58) Field of Classification Search
USPC ................................ 714/4.11; 709/224, 226
See application file for complete search history.

(56) References Cited

U.S. PATENT DOCUMENTS

| 2007/0294703 A1* | 12/2007 | Talu ................... G06F 9/44505 719/310 |
| 2009/0017916 A1* | 1/2009 | Blanchard, III ........ A63F 13/10 463/42 |
| 2010/0287548 A1* | 11/2010 | Zhou ..................... G06F 9/4856 718/1 |
| 2011/0131573 A1* | 6/2011 | Antony .................. G06F 3/023 718/1 |
| 2011/0173302 A1* | 7/2011 | Rider .................. G06F 9/44505 709/220 |
| 2011/0173303 A1* | 7/2011 | Rider .................. G06F 9/44505 709/220 |

(Continued)

*Primary Examiner* — Kamini Patel (57) ABSTRACT

Techniques for virtual machine (VM) availability during migration network failure and VM network failure in a first host computing system in a failover cluster are described. In one example embodiment, migration and VM network failure in the first host computing system is identified, wherein the first host computing system being configured to migrate VMs using the migration network and to route network traffic of VMs via the VM network. A migration network is then temporarily configured for the first host computing system over a management network in the virtual datacenter, wherein the management network being used to manage host computing systems by virtual management software (VMS) residing in a management server. The VMs running on the first host computing system are then migrated to at least one other host computing system in the failover cluster via the migration network temporarily configured on the management network.

24 Claims, 6 Drawing Sheets

(56) References Cited

U.S. PATENT DOCUMENTS

| | | | | |
|---|---|---|---|---|
| 2012/0137278 A1* | 5/2012 | Draper | G06F 8/65 | 717/170 |
| 2012/0159235 A1* | 6/2012 | Suganthi | G06F 11/2028 | 714/4.11 |
| 2012/0278801 A1* | 11/2012 | Nelson | G06F 9/45533 | 718/1 |
| 2013/0198468 A1* | 8/2013 | Antony | G06F 11/3442 | 711/162 |
| 2014/0108854 A1* | 4/2014 | Antony | G06F 11/203 | 714/4.2 |
| 2014/0229210 A1* | 8/2014 | Sharifian | G06Q 30/0201 | 705/7.12 |
| 2014/0337529 A1* | 11/2014 | Antony | H04L 45/22 | 709/226 |
| 2014/0365816 A1* | 12/2014 | Antony | G06F 9/45558 | 714/6.11 |
| 2014/0372790 A1* | 12/2014 | Antony | G06F 11/2023 | 714/4.11 |
| 2015/0006705 A1* | 1/2015 | Antony | H04L 43/0882 | 709/224 |
| 2015/0074262 A1* | 3/2015 | Antony | H04L 47/125 | 709/224 |
| 2015/0095446 A1* | 4/2015 | Ramasubramanian | H04L 67/1008 | 709/214 |
| 2015/0124813 A1* | 5/2015 | Srinivasan | H04L 12/56 | 370/392 |
| 2015/0161008 A1* | 6/2015 | Antony | G06F 11/1448 | 714/16 |
| 2015/0278041 A1* | 10/2015 | Ganesan | G06F 11/203 | 714/4.11 |
| 2015/0293772 A1* | 10/2015 | Ganesan | G06F 9/45558 | 718/1 |
| 2015/0355982 A1* | 12/2015 | Ganesan | G06F 11/2023 | 714/4.11 |

* cited by examiner

VM AVAILABILITY DURING MIGRATION AND VM NETWORK FAILURES IN HOST COMPUTING SYSTEMS

RELATED APPLICATION

Benefit is claimed under 35 U.S.C. 119(a)-(d) to Foreign application Serial No. 1689/CHE/2014 filed in India entitled "VM AVAILABILITY DURING MIGRATION AND VM NETWORK FAILURES IN HOST COMPUTING SYSTEMS", filed on Mar. 28, 2014, by VMware, Inc., which is herein incorporated in its entirety by reference for all purposes.

BACKGROUND

Today's trend is to configure separate networks for management, virtual machines (VMs) and migration of VMs in virtual datacenters. Typically, in such virtual datacenters a set of virtualization-based distributed infrastructure services provides virtual machine monitoring and management to automate and simplify provisioning, optimize resource allocation, and provide operating system and application-independent high availability to applications at lower cost and without the complexity of solutions used with static, physical infrastructure and other such environments. One of these distributed services is, a failover service, which provides easy-to-manage, cost-effective (high availability) HA clusters for all applications running on VMs that are often used for critical databases, file sharing on a network, business applications, and customer services, such as electronic commerce websites. In the event of a server hardware failure, affected VMs are automatically restarted on other physical servers during a failover operation to reduce downtime and information technology (IT) service disruption and to further reduce any dedicated standby hardware and installation of additional software requirements.

However, if a host computing system is partially isolated (i.e., isolated from virtual machine and migration networks and not the management network) from the other host computing systems in an high availability (HA) cluster in the virtual datacenter, the failover operation may not perform any migration operations as the management is still running and the virtual center is able to interact with the isolated host computing system. In such a scenario, the VMs running on the isolated host computing system may not be accessible by any user as the host computing system is isolated from the VMs network.

SUMMARY

One or more embodiments disclosed herein provide a method for VM availability during migration and VM network failures in host computing systems in a virtual datacenter. The method includes identifying migration network failure and VM network failure in the first host computing system, the first host computing system being configured to Migrate VMs using the migration network and to route network traffic of VMs Via the VM network. The method further includes temporarily configuring a migration network over a management network for the first host computing system in the virtual datacenter, wherein the management network being used to manage host computing systems by using virtual management software (VMS) residing in a management server. The method furthermore includes migrating the VMs running on the first host computing system to at least one other host computing systems in the failover cluster via the migration network temporarily configured on the management network.

Further embodiments of the present disclosure include a non-transitory computer-readable storage medium that includes instructions that enable a processing unit to implement one or more of the methods set forth above or the functions of the computer system set forth above. In one embodiment, a non-transitory computer-readable storage medium is provided having instructions that manage execution of a virtual machine. The instructions, when executed in a computing device, perform the steps of identifying migration network failure and VM network failure in the first host computing system, the first host computing system being configured to migrate VMs using the migration network and to route network traffic of VMs via the VM network. The instructions further include temporarily configuring a migration network over a management network for the first host computing system in the virtual datacenter, wherein the management network being used to manage host computing systems by using VMS residing in a management server. The instructions furthermore include migrating the VMs running on the first host computing system to at least one other host computing systems in the failover cluster via the migration network temporarily configured on the management network.

Embodiments of the present disclosure provide a computer system. The computing system includes multiple host computing systems in a failover cluster in a virtual datacenter. The computing system further includes a management network, a VM network and a migration network that are communicatively coupled to the multiple host computing systems. Moreover, the computing systems includes a management server that is communicatively to the management network, wherein the management server includes a failover module and an associated failover agent in each of the multiple host computing systems, wherein the failover module and the each failover agent are configured for providing VM availability during migration and VM network failures in a first host computing system in a failover cluster in the virtual datacenter.

DETAILED DESCRIPTION

Embodiments described herein protide VM a availability during migration and VM network failures in host computing systems in a virtual datacenter. The proposed technique temporarily configures a migration network on a management work for migration of VMs associated with a host computing system isolated from virtual machine and migration networks and not the management network (i.e., a partial isolation of the host computing: system with the other host computing systems in the failover enabled cluster) in the failover enabled cluster to migrate VMs to other host computing systems in the failover enabled cluster.

System Overview and Examples of Operation

Figure 1:
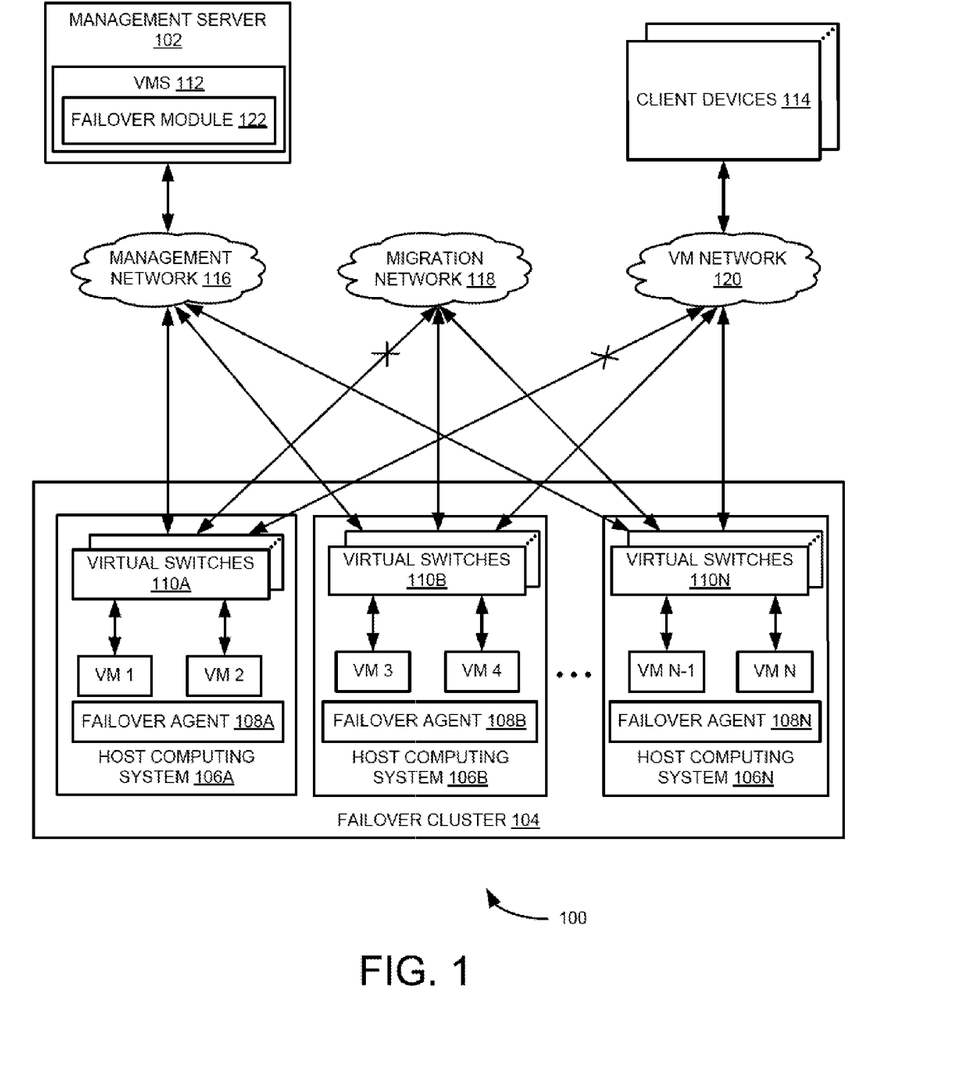
FIGS. 1-3 are block diagrams illustrating a system for VM availability during migration and VM network failures in host computing systems present in a failover cluster in a virtual datacenter, according to an example embodiment.

FIG. 1 is a block diagram illustrating system 100 for providing VM availability during migration and VM network failures in host computing systems in a failover cluster in a virtual datacenter, according to an example embodiment. As shown in FIG. 1, system 100 includes multiple host computing systems 106A-N and associated virtual machines (VMs) VM1-N hosted by multiple host computing systems 106A-N in a failover cluster 104. Also as shown in FIG. 1, system 100 includes management server 102 that is communicatively coupled to multiple host computing systems 106A-N via management network 116. Further as shown in FIG. 1, management server 102 includes failover module 122 residing in virtual management software (VMS) 112. In addition as shown in FIG. 1, multiple host computing systems 106A-N include associated failover agents 108A-N. Furthermore as shown in FIG. 1, multiple host computing systems 106B-N are communicatively coupled to migration network 118 and VM network 120 via associated virtual switches 110B-N except for lost network connectivity between host computing system 106A and migration and VM networks 118 and 120, respectively, via virtual switch 110A. In addition, as shown in FIG. 1, VM network is communicatively coupled to client devices 114.

In operation, failover agent 108A associated with first host computing system 106A in multiple host computing systems 106A-N in failover cluster 104 identifies migration network failure along with the VM network failure. In these embodiments, migration network 118 is configured to migrate VMs and VM network 120 is configured to route network traffic of VMs. For example, failover agent 108A detects a partial network connectivity failure (i.e., detects both the migration network connectivity and VM network connectivity failures while the management network is still operational). If failover agent 108A is a master, then a partial network connectivity failure is identified and declared within a first predetermined tune interval (for example, about 30 seconds) and if failover agent 108A is a slave then a partial network connectivity failure is identified and declared within a second predetermined time interval (for example, about 15 seconds).

Figure 2:
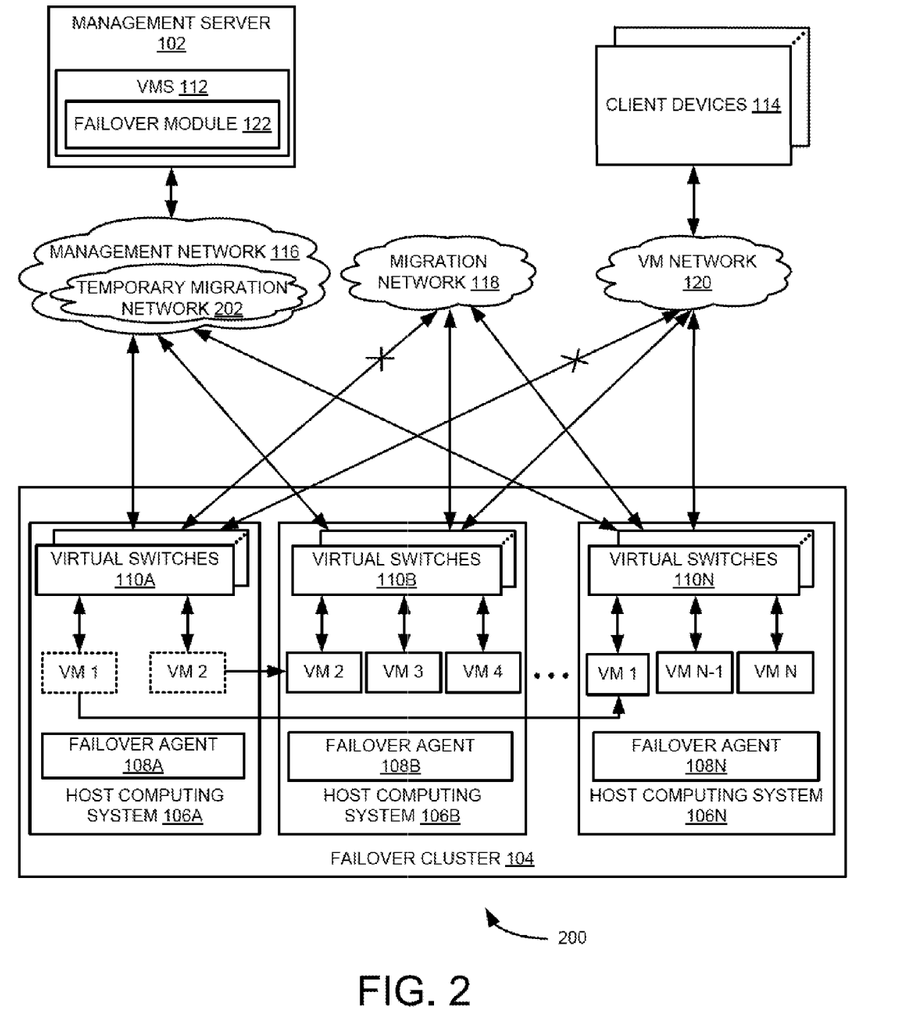

As shown in FIG. 2, failover module 122 then temporarily configures a migration network 202 over management network 116 for the first host computing system. In these embodiments, management network 116 is used to manage host computing systems using VMS residing in management server 102.

As shown in FIG. 2, failover agent 108A associated with first host computing system 106A then migrates the VMs (VM1 and VM2) running on the first host computing system to at least one other host computing system in the multiple host computing systems 106B-N in failover cluster 104 via temporarily configured migration network 202. In these embodiments, management network 116 is used to manage multiple host computing systems 106A-N by virtual management software (VMS) residing in management server 102. In some embodiments, failover agent 108A associated with the first host computing system 106A then migrates the VMs (VM1 and VM2) running on first host computing system 106A to at least one other host computing system in multiple host computing systems 106B-N in failover cluster 104 using a resource scheduling framework that may reside in VMS 112 via temporarily configured migration network 202 on the management network. In some embodiments, resource scheduling framework may be configured to determine whether the network traffic running on management network 116 is below a threshold value for a predetermined time interval. Based on the outcome of the determination, if the network traffic running on management network 116 is below the threshold value for the predetermined time interval, the VMs running on first host computing system 106A are migrated to at least one other host computing system—in multiple host computing systems 106B-N via temporarily configured migration network 202. Further based on the outcome of the determination, if the network traffic running on management network 116 is above or equal to the threshold value, then failover module 122 initiates a self restart of first host computing system 106A via failover agent associated with first host computing system 106A. During restart any VMs running on first host computing system 106A are powered off and failover module 122 will restart VMs on any other host computing systems 106B-N available in failover cluster 104.

In some embodiments, migration network 118 on virtual switches 110A associated with first host computing system 106A and at least one other host computing system in multiple host computing systems 106B-N are temporarily configured. The VMs (VM1 and VM2) running on first host computing system 106A are then migrated to at least one other host computing system in multiple host computing systems 106B-N in failover cluster 104 via temporarily configured migration network 202. Further in some embodiments, temporary migration network 202 is configured on virtual switches associated with each of multiple host computing systems 106A-N. The VMs (VM1 and VM2) running on first host computing system 106A are then migrated to any other host computing system in multiple host computing systems 106B-N in failover cluster 104 via temporarily configured migration network 202.

Figure 3:
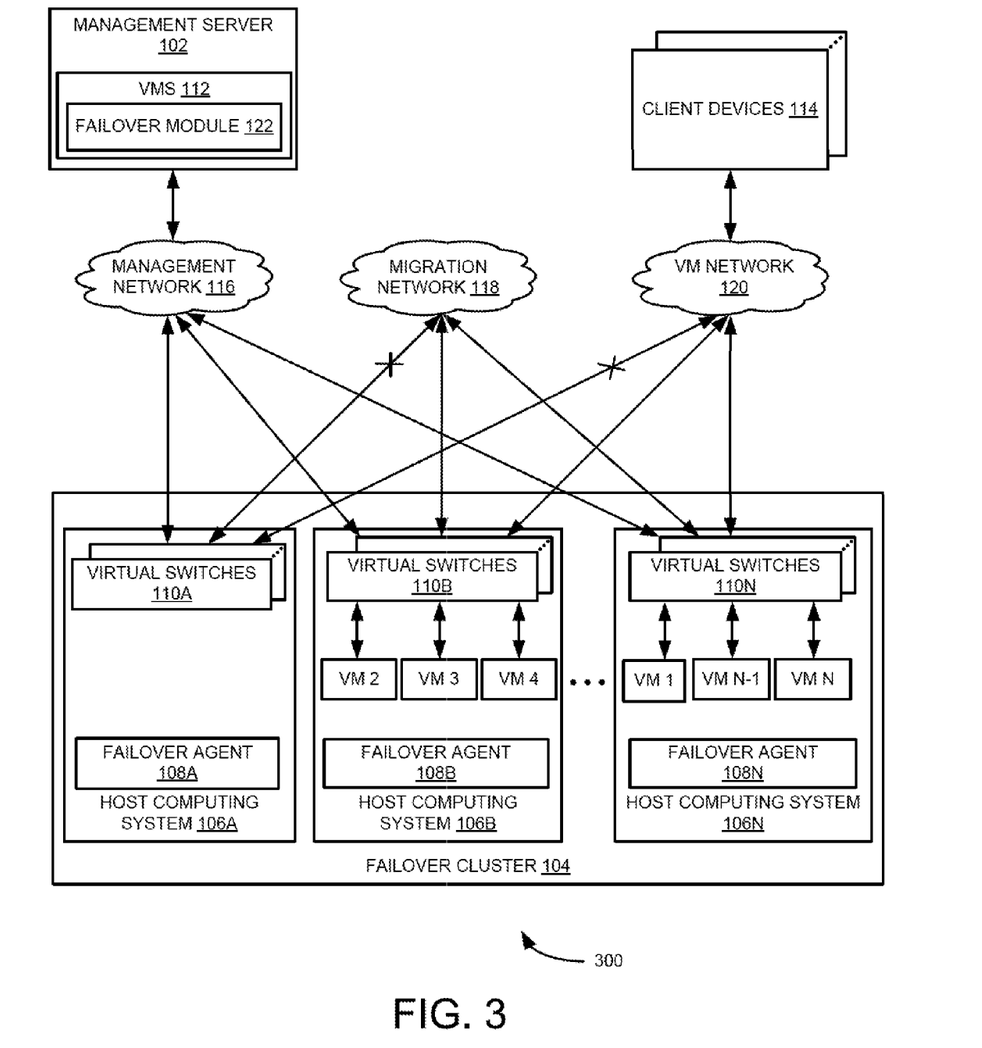

Further as shown in FIGS. 2 and 3, failover module 122 places the first host computing system 106A into a network maintenance mode upon migrating the VMs (VM1 and VM2) running on first host computing system 106A to any one or more of remaining host computing systems 106B-N. Further as shown in FIG. 3, upon completing migration of VMs running on first host computing system 106A to any one of other remaining host computing systems 106B-N in failover cluster 104 and also upon placing first host computing system 106A into a network maintenance mode, failover module 122 removes temporarily configured migration network 202 from management network. Furthermore, failover module 122 removes the first host computing system 106A from the network maintenance mode and places it back on active mode in failover cluster 104 upon both the migration network 118 and the VM network 120 associated with the first host computing system coming back up and running from the migration and VM network failures mode in the virtual datacenter 100. Upon placing first host computing system 106A back in active mode in failover cluster 104, any resource scheduling framework residing in VMS 112 may migrate VMs to first host computing system 106A and utilize the first host computing system 106A.

Also, although certain terms are used primarily herein, other terms could be used interchangeably to yield equivalent embodiments and examples. For example, the term "host computing system" may be used interchangeably with "physical host", "physical machine" or "physical device". Further for example, it is well-known that equivalent terms in the field of system virtualization or similar or related fields could be substituted for such terms as "physical computer," "hypervisor," "virtual machine," or the like. Further, the terms "virtual computing environment" and "virtual datacenter" are used interchangeably throughout the document. The terms "network failure", "network connectivity failure", and "lost network connectivity" are used interchangeably throughout the document.

Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 4:
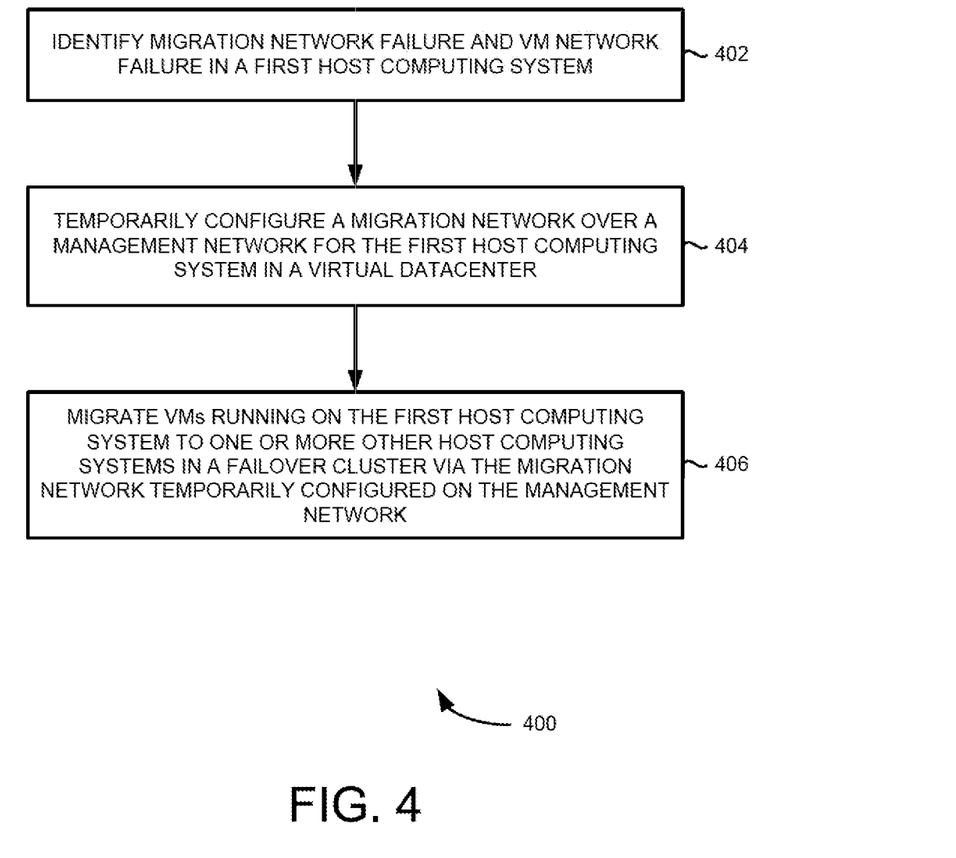
FIG. 4 is a flow diagram of process for VM availability during migration and VM network failures in host computing systems in a virtual datacenter, according to an example embodiment.

FIG. 4 is a flow diagram of process 400, for providing VM availability during migration and VM network failures in host computing systems in a failover cluster in a virtual datacenter, according to an example embodiment.

The process 400 begins at block 402, where migration network failure and VM network failure associated with a first host computing system in the failover cluster in the datacenter is identified. In these embodiments, the first host computing system is configured to migrate VMs using the migration network and to route network traffic of VMs via the VM network. At block 404, a migration network is temporarily configured over a management network for the first host computing system in the virtual datacenter upon identifying the migration network failure and VM network failure in the first host computing system.

At block 406, The VMs running on the first host computing system are migrated to at least one other host computing system—in multiple host computing systems in the failover cluster via the migration network temporarily configured on the management network. In these embodiments, the management network is used to manage host computing systems by using VMS residing in a management server.

In some embodiments, process 400 includes placing the first host computing system into a network maintenance mode upon migrating the VMs to at least one other host computing system in the failover cluster via the temporarily configured migration network. Further in some embodiments, process 400 includes removing the first host computing system from the network maintenance mode and placing an active mode upon both the migration network and the VM network associated with the first host computing system coming back up and running from the migration and VM network failures mode in the virtual datacenter.

Process 400 for providing VM availability during migration and VM network failures in host computing systems in a failover cluster in a virtual datacenter is explained in more detail above with reference to the system diagrams 100-300 shown in FIGS. 1-3.

Figure 5:
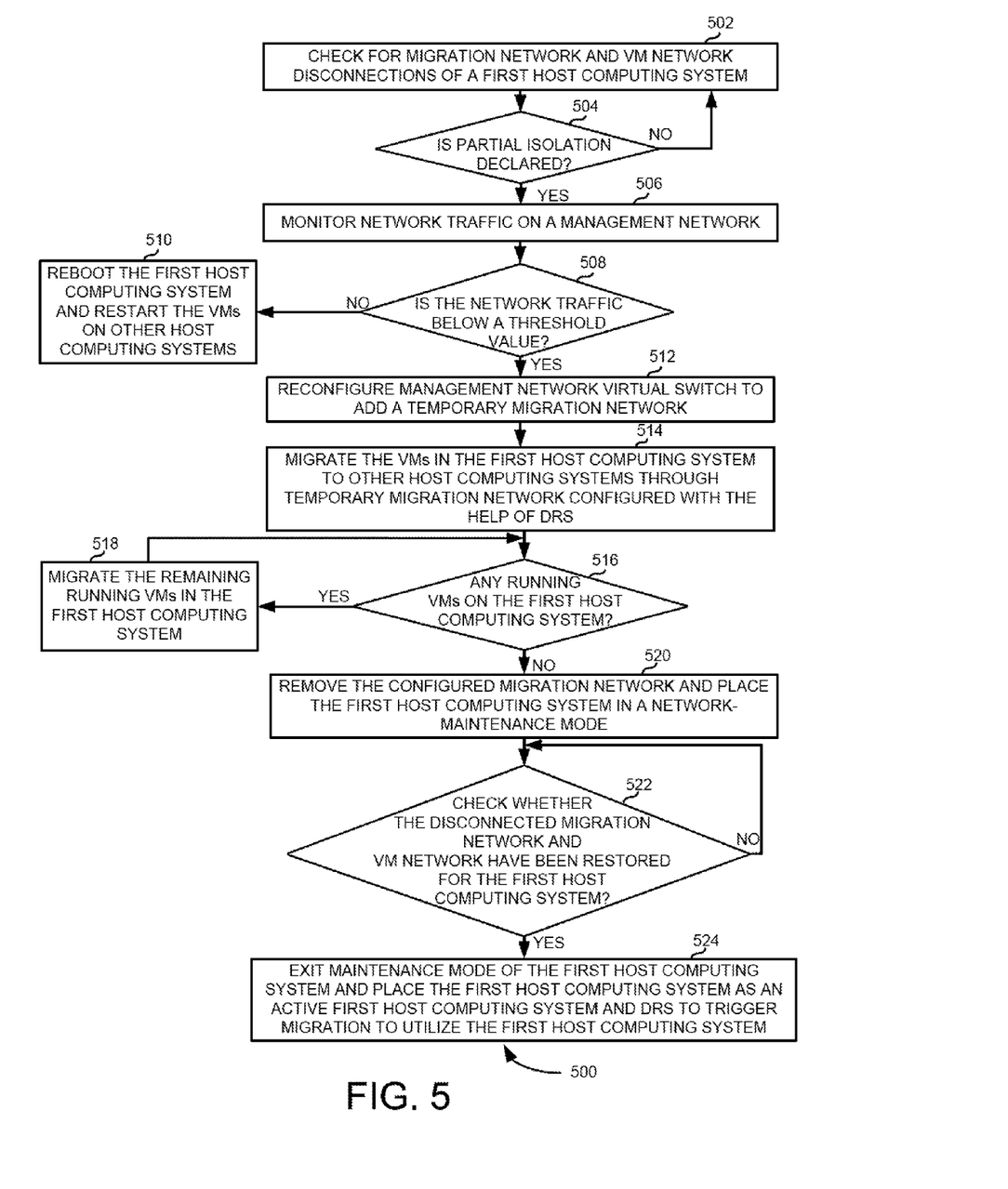
FIG. 5 is another flow diagram of process for VM availability during migration and VM network failures in host computing systems in a virtual datacenter, according to an example embodiment.

FIG. 5 is a flow diagram of another process 500, for providing VM availability during migration and VM network failures in host computing systems in a failover cluster in a virtual datacenter, according to an example embodiment.

At block 502, process 500 checks for migration network and VM network disconnections (partial isolation) of a first host computing system in the failover cluster in the virtual datacenter. At block 504, based on the outcome of the checking at block 502, process 500 goes back to block 502, if the migration network and the VM network are not disconnected from the first host computing system. Further at block 504, process 500 goes to block 506 if the migration network and the VM network are disconnected from the first host computing system.

At block 506, process 500 monitors network traffic on a management network. At block 508, a determination is made as to whether the network traffic over the management network is below a threshold value. Based on the outcome of the determination at block 508, process 500 goes to block 510 and reboots the first host computing system and restarts the VMs running on the first host computing system on other host computing systems in the failover cluster if the network traffic over the management network is above or equal to the threshold value for a predetermined time interval. Further based on the outcome of the determination at block 508, the process 500 goes to block 512 and reconfigures the management network virtual switch to add a temporary migration network over the management network.

At block 514, VMs in the first host computing system are migrated to other host computing systems through the temporary migration network configured over the management network after finding the resource requirement for the VM using a dynamic resource scheduler (DRS).

At block 516, a determination is made as to whether there are any VMs still running on the first host computing system. Based on the outcome of the determination at block 516, if there are still some VMs running on the first host computing system, then the process 500 goes to block 518 and migrates any remaining VMs running on the first host computing system to the other host computing systems running in the failover cluster using the temporarily configured migration network. Further based on the outcome of the determination at block 516, if there are no VMs running on the first host computing system, then the process 500 goes to block 520 and removes the temporarily configured migration network from all the hosts configured with it and places the first host computing system in network maintenance mode.

At block 522, process 500, determines whether the disconnected migration network and the VM network has been restored for the first host computing system. Based on the outcome of the determination at block 522, process 500 goes back to checking at block 522 if the disconnected migration network and the VM network are not restored for the first host computing system. Based on the outcome of the determination at block 522, process 500 goes to block 524 and exits from the first host computing system maintenance mode and places the first host computing system in active mode so that the DRS can trigger migration of VMs in the failover cluster to start using the first host computing system.

Figure 6:
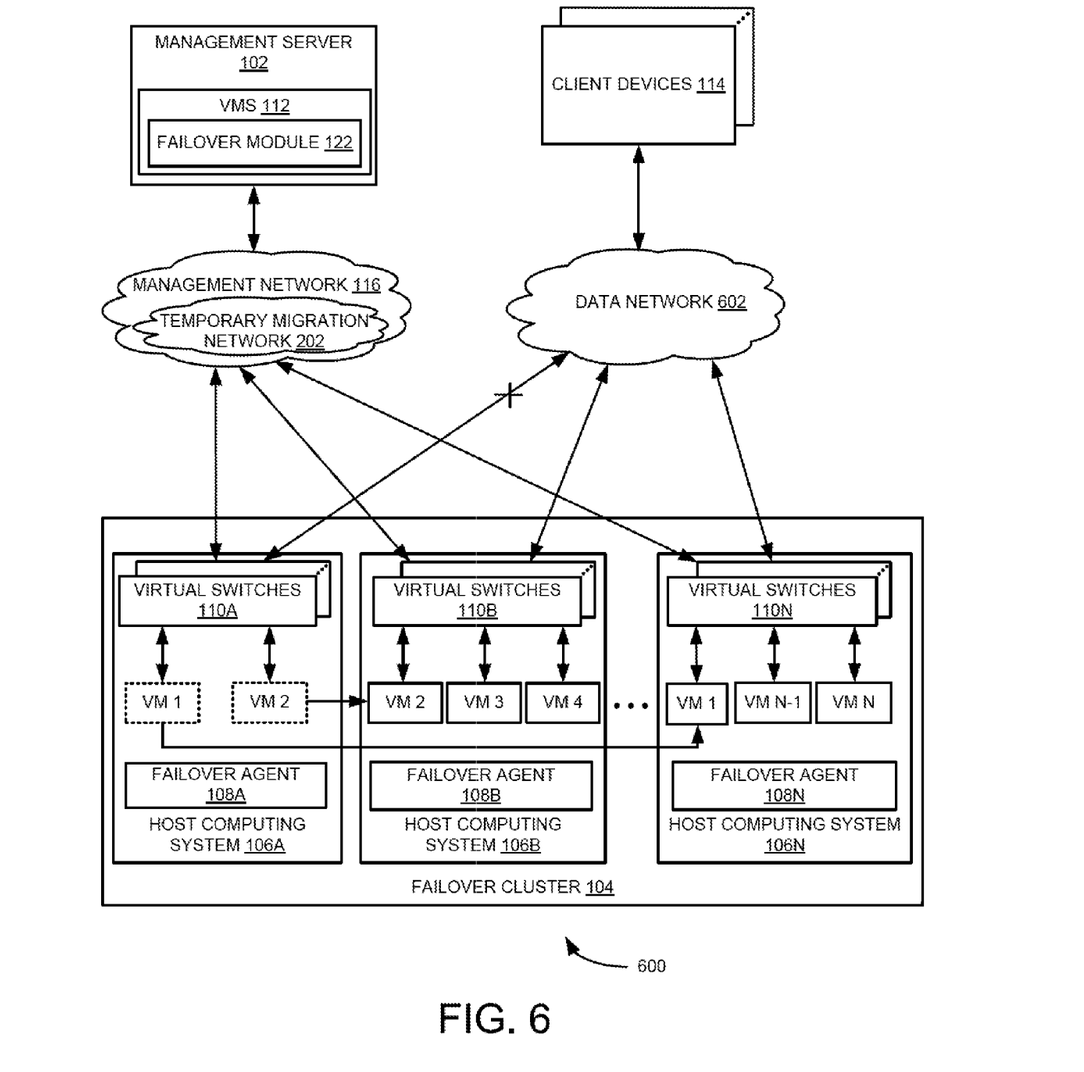
FIG. 6 is a block diagram illustrating a system for VM availability during data network failure in host computing systems present in a failover cluster in a virtual datacenter, according to an example embodiment.

FIG. 6 is a block diagram 600 illustrating a system for VM availability during data network failure in host computing systems present in a failover cluster in a virtual datacenter, according to an example embodiment. Particularly, FIG. 6 illustrates an alternative embodiment of FIGS. 1-3, where the data network 602 carries both migration traffic and normal VM data traffic. In other words, the migration network 118 and VM network 120 as shown in FIGS. 1-3 are configured in a single data network 602. In some embodiments, the migration network 118 and the VM network 120 are provided on a same physical network.

In operation, failover agent 108A associated with first host computing system 106A in multiple host computing systems 106A-N in failover cluster 104 identifies data network failure. In these embodiments, data network 602 is configured to migrate VMs and to route network traffic of VMs. As shown in FIG. 6, failover module 122 then temporarily configures a migration network 202 over management network 116 for first host computing system 106A. In these embodiments, management network 116 is used to manage host computing systems using VMS residing in management server 102. As shown in FIG. 6, failover agent 108A associated with first host computing system 106A then migrates the VMs (VM1 and VM2) running on the first host computing system to at least one other host computing system in the multiple host computing systems 106B-N in failover cluster 104 via temporarily configured migration network 202.

The architecture shown in FIGS. 1-3 and 6 may in some embodiments be partially or fully virtualized. For example, systems 100-300 and 600 shown in FIGS. 1-3 and 6 may be one or possibly many VMs executing on physical hardware and managed by a hypervisor, VM monitor, or similar technology. Also, multiple host computing systems 106A-N show in FIGS. 1-3 and 6 may include virtualization logic to manage multiple VMs.

In an example embodiment, components/modules of failover module 122 and failover agents 108A-N are implemented using standard programming techniques. In other embodiments, failover module 122 and failover agents 108A-N may be implemented as instructions processed by a VM that executes as one of other programs.

Furthermore, in some embodiments, some or all of the components of failover module 122 and failover agents 108A-N may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g. as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for migrating VMs across host computing systems based on cache characteristics in a virtualized datacenter are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for virtual machine (VM) availability during migration and VM network failures in a first host computing system in a failover cluster in a virtual datacenter, comprising:
identifying migration network failure and VM network failure in the first host computing system, the first host computing system being configured to migrate VMs using the migration network and to route network traffic of VMs via the VM network;
temporarily configuring a migration network over a management network for the first host computing system in the virtual datacenter upon identifying migration network failure and VM network failure in the first host computing system, wherein the management network being used to manage host computing systems by using virtual management software (VMS) residing, in a management server; and
migrating the VMs running on the first host computing system to at least one other host computing system in the failover cluster via the migration network temporarily configured on the management network.

2. The method of claim 1, further comprising:
placing the first host computing system into a network maintenance mode.

3. The method of claim 2, further comprising:
removing the first host computing system from the network maintenance mode and placing on active mode upon both the migration network and the VM network associated with the first host computing system coming back up and running from the migration and VM network failures mode in the virtual datacenter.

4. The method of claim 1, wherein migrating the VMs running on the first host computing system to at least one other host computing system in the failover cluster via the migration network temporarily configured on the management network comprises:
determining whether the network traffic running on the management network is below a threshold value for a predetermined time interval;
if so, migrating the VMs running on the first host computing system to at least one other host computing system in the failover cluster via the temporarily configured migration network on the management network; and
if not, initiating a self restart of the first host computing system via, an associated failover agent for restarting, any VMs running on the first host computing system on any other host computing systems available in the failover cluster.

5. The method of claim 1, wherein, in migrating the VMs, the at least one other host computing system is selected using a resource scheduling framework.

6. The method of claim 5, wherein migrating the VMs running on the first host computing system to at least one other host computing system in the failover cluster via the migration network temporarily configured on the management network comprises:
temporarily configuring the migration network on virtual switches associated with the first host computing system and the at least one other host computing system; and migrating the VMs running on the first host computing system to the at least one other host computing system in the failover cluster via the temporarily configured migration network.

7. The method of claim 1, wherein migrating the VMs running on the first host computing system to at least one other host computing system in the failover cluster via the migration network temporarily configured on the management network further comprises:
   temporarily configuring the migration network on virtual switches associated with each host computing system in the failover cluster; and
   migrating the VMs running on the first host computing system to any other host computing system in the failover cluster via the temporarily configured migration network.

8. The method of claim 1, wherein the migration network and the VM network are provided on a same physical network.

9. A non-transitory computer-readable storage medium including instructions that are configured, when executed by a computing system, to perform a method for VM availability during migration and VM network failures in a first host computing system in a failover cluster, the method comprising:
   identifying migration network failure and VM network failure in the first host computing system, the first host computing system being configured to migrate VMs using the migration network and to route network traffic of VMs via the VM network;
   temporarily configuring a migration network over a management network for the first host computing system in the virtual datacenter upon identifying migration network failure and VM network failure in the first host computing system, wherein the management network being used to manage host computing systems by using VMS residing in a management server; and
   migrating the VMs running on the first host computing system to at least one other host computing system in the failover duster via the migration network temporarily configured on the management network.

10. The non-transitory computer-readable storage medium of claim 9, further comprising:
   placing the first host computing system into a network maintenance mode.

11. The non-transitory computer-readable storage medium of claim 10, further comprising:
   removing the first host computing system from the network maintenance mode and placing on active mode upon both the migration network and the VM network associated with the first host computing system coming back up and running from the migration and VM network failures mode in the virtual datacenter.

12. The non-transitory computer-readable storage medium of claim 9, wherein migrating the VMs running on the first host computing system to at least one other host computing system in the failover duster via the migration network temporarily configured on the management network comprises:
   determining whether the network traffic running on the management network is below a threshold value for a predetermined, time interval;
   if so, migrating the VMs running on the first host computing system to at least one other computing system in the failover cluster via the temporarily configured migration network on the management network; and
   if not, initiating a self restart of the first host computing system via an associated failover agent for restarting any VMs running on the first host computing system on any other host computing systems available in the failover cluster.

13. The non-transitory computer-readable storage medium of claim 9, wherein, in migrating the VMs, the at least one other host computing system is selected using a resource scheduling framework.

14. The non-transitory computer-readable storage medium of claim 13, wherein migrating the VMs running on the first host computing system to at least one other host computing system in the failover cluster via the migration network temporarily configured on the management network comprises:
   temporarily configuring the migration network on virtual switches associated with the first host computing system and the at least one other host computing system in the failover cluster; and
   migrating the VMs running on the first host computing system to the at least one other host computing system in the failover cluster via the temporarily configured migration network.

15. The non-transitory computer-readable storage medium of claim 9, wherein migrating the VMs running on the first host computing system to the at least one other host computing system in the failover cluster via the migration network temporarily configured on the management network further comprises:
   temporarily configuring the migration network on virtual switches associated with each host computing system in the failover cluster; and
   migrating the VMs running on the first host computing system to any other host computing system in the failover cluster via the temporarily configured migration network.

16. The non-transitory computer-readable storage medium of claim 9, wherein the migration network and the VM network are provided on a same physical network.

17. A computing system for VM availability during migration and VM network failures in a first host computing system in a failover cluster, the system comprising:
   multiple host computing systems, wherein each host computing system hosting multiple VMs;
   a management network communicatively coupled to the multiple host computing systems;
   a VM network communicatively coupled to the multiple host computing systems for routing network traffic of VMs;
   a migration network communicatively coupled to the multiple host computing systems for migrating VMs running on the multiple host computing systems; and
   a management server communicatively coupled to the management network, wherein the management server comprising a failover module, and wherein each host computing system comprising an associated failover agent, and they are configured to
      identify migration network failure and VM network failure in the first host computing system, the first host computing system being configured to migrate VMs using the migration network and to route network traffic of VMs via the VM network;
      temporarily configure a migration network over a management network for the first host computing system in the virtual datacenter upon identifying migration network failure and VM network failure in the first host computing system, wherein the management network being used to manage host computing systems by using VMS residing in a management server; and migrate the VMs running on the first host computing system to at least one other host computing system in the failover cluster via the migration network temporarily configured on the management network.

18. The computing system of claim 17, further configured to:

place the first host computing system into a network maintenance mode.

19. The computing systems of claim 18, further configured to:

remove the first host computing system from the network maintenance mode and placing it on active mode upon both the migration network and the VM network associated with the first host computing system coming back up and running from the migration and VM network failures mode in the virtual datacenter.

20. The computing system of claim 17, wherein migrating the VMs running on the first host computing system to the at least one other host computing system in the failover cluster via the migration network temporarily configured on the management network comprises:

determine whether the network traffic running on the management network is below a threshold value for a predetermined time interval;

if so, migrate the VMs running on the first host computing system to at least one other host computing system in the failover cluster via the temporarily configured migration network on the management network; and if not, initiate a self restart of the first host computing system via an associated failover agent for restarting any VMs running on the first host computing system on any other host computing systems available in the failover cluster.

21. The computing system of claim 17, wherein, in migrating the VMs, the at least one other computing system in the failover cluster is selected using a resource scheduling framework.

22. The computing system of claim 21, wherein migrating the VMs running on the first host computing system to at least one other host computing system in the failover cluster via the migration network temporarily configured on the management network comprises:

temporarily configuring the migration network on virtual switches associated with the first host computing system and the at least one other host computing system in the failover cluster; and migrating the VMs running on the first host computing system to the hit least one other host computing system in the failover cluster via the temporarily configured migration network.

23. The computing, system of claim 17, wherein migrating the VMs running on the first host computing system to at least one other host computing system in the failover cluster via the migration network temporarily configured on the management network further comprises:

temporarily configuring the migration network on virtual switches associated with each host computing system in the failover cluster; and migrating the VMs running on the first host computing system to any other host computing system in the failover duster via the temporarily configured migration network.

24. The computing system of claim 17, wherein the migration network and the VM network are provided on a same physical network.

* * * * *